March 2, 1926.
C. AUTH
1,574,747
AUTOMATIC BATTERY CHARGING SYSTEM
Filed July 19, 1923
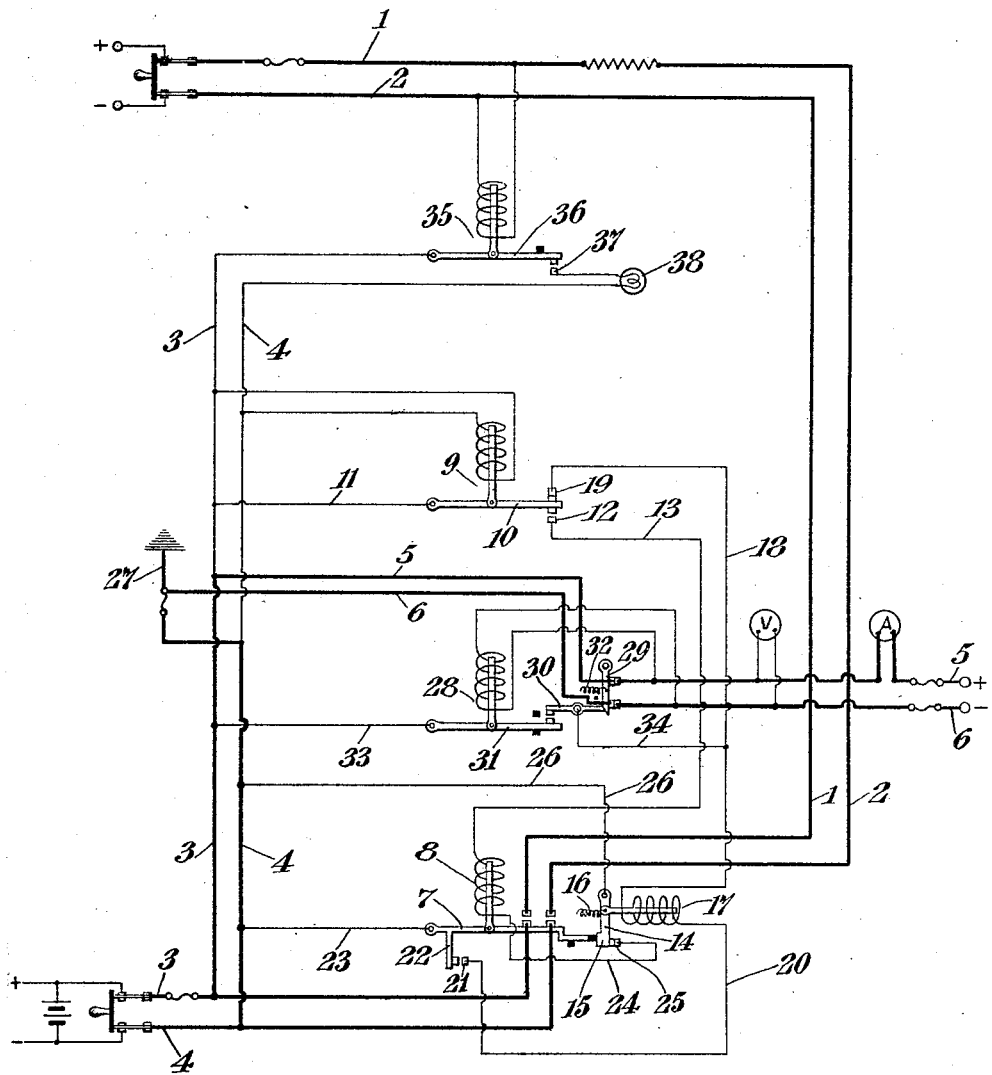
Inventor
Charles Auth
By his Attorneys
Prindle Wright Neal & Bean Patented Mar. 2, 1926.

1,574,747

UNITED STATES PATENT OFFICE.

CHARLES AUTH, OF NEW YORK, N. Y., ASSIGNOR TO EMMA LOUISE AUTH, OF BROOKLYN, NEW YORK.

AUTOMATIC BATTERY-CHARGING SYSTEM.

Application filed July 19, 1923. Serial No. 652,484.

*To all whom it may concern:*

Be it known that I, CHARLES AUTH, a citizen of the United States, and a resident of New York city, in the county of New York and State of New York, have invented a certain new and useful Automatic Battery-Charging System, of which the following is a specification.

The invention relates to an electrical system wherein storage batteries are employed as the source of energy for a service circuit, and wherein the voltage of the batteries is automatically maintained at the proper value by charging the batteries from a lighting or other power circuit when their voltage falls below a certain point. One object of the invention is to provide a system of the above nature wherein the connections made between the batteries and the power circuit when the battery is to be charged, will be positively held in closed position against minor voltage fluctuations, to prevent the repeated opening and closing of such connections when the voltage of the batteries hovers around the charging point. In other words, once the charging operation begins, the connections between the power circuit and the batteries are so controlled as to continue charging until a point is reached where there is little likelihood that the charging operation will be soon resumed after it ceases.

The invention also comprises certain precautions against abnormal circuit conditions, particularly by way of opening the service circuit when the voltage impressed thereon rises above a predetermined value, all as is more fully set forth hereinafter.

Further objects and advantages of the invention will be in part obvious and in part specifically pointed out in the description hereinafter contained, which, taken in connection with the accompanying drawings, discloses a preferred embodiment thereof; such embodiment, however, is to be considered merely as illustrative of its principles.

In the drawings:

The single figure is a diagrammatic view of a system adapted to operate in accordance with the invention.

In electrical systems of the above nature, the charging connections between the power circuit and the batteries are usually made and broken by means of a relay or the like, which is controlled as to its position according to the voltage of the batteries; thus when this voltage is at approximately the value at which the position of the relay will be shifted, the system tends to charge for a short time until the voltage of the batteries rises slightly, when the relay will be shifted again to cut out the power circuit, the above "hunting" of the relay being likely to be continued over long periods with undue sparking at the contacts, noise, wear, etc. Furthermore, it is a difficult matter to adjust or control the electrical or electro-magnetic characteristics of the elements making up such a system, to avoid the above difficulty.

In accordance with the present invention, the switch member which cuts in and out the power circuit, is locked or held in position to such an extent that it will not vibrate or flutter under minor voltage fluctuations. The invention is illustrated as applied to a system having a power circuit comprising conductors 1 and 2, a battery circuit having conductors 3 and 4, and a service circuit comprising conductors 5 and 6.

When the voltage of the battery circuit 3, 4, falls below a predetermined point, a switch member 7 is actuated to close circuit between the conductors 1 and 3, and 2 and 4 respectively. In the present instance the switch member 7 is moved to closed position by a coil 8, which is energized when the battery voltage drops; as shown, a relay 9 is shunted across the conductors 3 and 4 in such manner, that when the voltage of the batteries drops, armature 10 of the relay, which is connected by a wire 11 to the conductor 3, will fall into engagement with a contact 12, which is in circuit with the coil 8, through a wire 13. At the same time, the coil 8 is connected to the remaining battery conductor 4, preferably as will be later described in greater detail, with the result that the switch member 7 is held in closed position so long as armature 10 engages contact 12, thus charging the batteries.

However, an increase in the battery voltage which is sufficient to lift armature 10 away from contact 12 will not necessarily permit switch member 7 to fall to open position, due to the fact that a locking device is also provided to hold the switch closed. In the present instance, this locking device takes the form of a pivoted latch 14 having a shoulder 15 adapted to underlie the end of switch member 7 when the latter is in closed position, and the latch 14 is normally urged by a spring 16 to catch under the switch member 7 when the latter is closed, and hold it closed.

When the batteries have been charged sufficiently to bring their voltage up to a point such that further charging is not likely to be necessary for a substantial period of time, the latch 14 is withdrawn from switch member 7 and, the armature 10 being also elevated at this time, the switch member will drop to open position against the shoulder 15 of latch 14. In the present instance the latch 14 is retracted by means of coil 17, which is connected by a wire 18, to a contact 19 associated with the armature 10 and engaging the latter when the battery voltage has been brought up to a predetermined point. If switch member 7 be closed at this time, circuit will be made to coil 17 through conductor 11, armature 10, contact 19, wire 18, coil 17, a wire 20 connected between coil 17 and contact 21, which latter is engaged by an arm 22 when the switch member 7 is closed, and a wire 23 connecting switch member 7 to conductor 4. The latch 14, however, will not release switch member 7 in case of minor voltage increases which may have been sufficient to separate armature 10 from contact 12, but only in case armature 10 has been elevated to engage contact 19 and energize coil 17 sufficiently to hold the latch 14 in retracted position while switch member 7 falls. Thus rapid vibrations of switch member 7 are prevented, and the charging operation when once begun, continues to a point where further charging will not be necessary until after a substantial period of time.

In the present instance the latch 14 also breaks circuit through coil 8, after switch member 7 has been closed; as shown, a wire 24 leads from coil 8 to a contact 25, which engages latch 14 when the latter is in retracted position, and the latch 14 is connected to conductor 4 through wire 26; thus circuit may be made through coil 8 only when the latch is in retracted position, and the coil is deenergized as soon as switch member 7 is closed.

Current flows from the batteries through conductors 3 and 4 to the service conductors 5 and 6, the negative conductors 4 and 6 being grounded in the present instance through a lead 27. I prefer to arrange the system so that in the event of abnormally high voltage in the service circuit, the latter as well as the charging circuit will be automatically opened. In the present instance a relay 28 is shunted across the service conductors 5 and 6, and a circuit breaker 29 is interposed in the service circuit and normally held closed by means of a pivoted trip 30. The armature 31 of relay 28 is normally in lower position, but in case of excessive voltage in the service circuit the coil of relay 28 draws up the armature 31 and tilts trip 30 to release switch arm 29 and permit a spring 32 associated with such switch arm to move the latter to open position, breaking the service circuit. Armature 31 is connected to conductor 3 by a wire 33 and the trip 30 is connected to coil 17 through a wire 34; thus when excessive voltage exists in the service circuit, coil 17 is energized through conductors 3, 33, armature 31, trip 30, wires 34 and 18, coil 17, wire 20, contact 21, switch arm 22 and wire 23; the charging circuit, therefore, will be opened due to the retraction of latch 14 from switch member 7.

The system may also include a signal or alarm to indicate the failure of voltage in the charging circuit; as shown, relay 35 is shunted across power conductors 1 and 2, whereby an armature 36 of the relay is only held up; but if the voltage should fail between conductors 1 and 2 the armature 36 drops into engagement with a contact 37, making circuit to a trouble lamp or the like 38 to which current is led by conductors 3 and 4.

While a specific embodiment of the invention has been described, it will be obvious that many changes may be made therein without departing from its principles, as defined in the following claims.

I claim:

1. A battery charging system comprising a power circuit, a charging circuit, a service circuit, a switch member for shifting the power circuit into and out of connection with the charging circuit, a locking device adapted to hold said switch member in closed position against minor voltage fluctuations in the battery circuit, a circuit breaker in said service circuit, and means for releasing said locking device upon the actuation of said circuit breaker.

2. The combination set forth in claim 1, wherein said locking device is released by an electromagnetic coil, and such circuit breaker includes contacts making circuit to said coil when the circuit breaker is opened.

In testimony that I claim the foregoing, I have hereunto set my hand this 17th day of July, 1923.

CHARLES AUTH